UNITED STATES PATENT OFFICE.

LUCIEN JUMAU, OF PARIS, FRANCE.

PROCESS FOR OBTAINING PURE COPPER.

No. 885,622.

Specification of Letters Patent.

Patented April 21, 1908.

Application filed May 31, 1906. Serial No. 319,489.

*To all whom it may concern:*

Be it known that I, LUCIEN JUMAU, citizen of France, residing at Paris, in the said Republic, have invented new and useful Improvements in Processes for Obtaining Pure Copper, (for which a French patent has been filed March 20, 1906,) of which the following is a specification.

My invention relates to an improved process for obtaining pure metallic copper from a solution of salts of copper, and it consists in the steps and processes herein described and claimed.

In the usual wet method of extracting copper from its ores, the ores, with or without previous roasting, are leached with a suitable solution for dissolving the copper; in the operation of my invention, I prefer to employ an ammoniacal leaching solution.

By my improved process, the solution containing salts of copper is treated with a suitable sulfite, such as, for example, a normal or acid sulfite of ammonia, or sulfite of hydrogen, commercially known as sulfurous acid; heat being preferably employed during such treatment for the purpose of producing a more compact and less hydrated precipitate. A precipitate so produced contains cuprous sulfite, occurring in the form of a cuproso-cupric sulfite, or a double ammonium salt, or a mixture of said compound. As a matter of economy, the sulfurous acid used in this first step may be produced by the roasting of the cupriferous ore, if the latter happens to be a sulfid ore; if ammonium sulfite is to be used, this is readily made by passing a current of sulfurous acid into ammonia.

The precipitate obtained as aforesaid is separated from the liquid, which may be used for lixiviating a fresh batch of ore, either directly or after it has been regenerated; for instance, if the lixiviating solution is to be ammoniacal, the dissolved sulfurous acid may be eliminated and the appropriate quantity of ammonia added. The cost of the ammonia is always low because the gas is easily regenerated from the solutions by treating them with lime, baryta or magnesia, all of which frequently occur in the gangue of copper ores. A portion of the copper contained in the precipitate is then obtained in a metallic state by treating said precipitate with an acid which will combine to form cupric salts, but not cuprous salts, such as sulfuric acid. The final operation may be stated as follows:

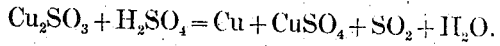

$$Cu_2SO_3 + H_2SO_4 = Cu + CuSO_4 + SO_2 + H_2O.$$

The metallic copper is separated from the solution; the latter still contains copper and may be treated in the same manner as the original solution, that is to say, so as to obtain a precipitate of cuprous sulfite. It is preferable, however, first to enrich it in copper, either by evaporation or by employing the solution for lixiviating a fresh quantity of ore.

The two treatments for obtaining the precipitate of cuprous sulfite and that of copper, may succeed each other in a continuous manner, with very small cost of sulfurous acid, since the latter is regenerated in accordance with the foregoing equation.

The metallic copper having been washed may be melted directly to ingots or made into briquets by powerful compression. It may be treated, if necessary, by ordinary metallurgical or electrical refining methods, and the process according to this invention may be completed usefully by a very simple electrolytic refining of the precipitated copper obtained as described. For this purpose the copper is compressed, for instance by a hydraulic press, so as to form anodes of suitable shape and dimensions, or so as to coat electrically conducting supports of lead, carbon, copper or the like, much as is practiced in coating the plates of accumulators; this coating may also be performed by hand. The plates thus made are used as anodes in an electrolytic refining bath, the cathodes consisting of conducting supports such as are ordinarily used, while the electrolyte may be, for example, the initial neutral, acid or basic solution of copper.

The process just described may advantageously be varied in certain cases as follows:—Instead of treating as aforesaid the whole of the cuprous sulfite precipitate to obtain metallic copper, only a part may be treated, or the treatment may be entirely avoided by operating in the following manner. The anodes are made from the cuprous sulfite or a mixture of the sulfite and the metallic copper. One of the most advantageous methods is to make a support from the precipitated copper by means of the press, and to coat this support with the precipitated cuprous sulfite by pressure.

In the electrolysis conducted as hereinbefore described, there is obtained a deposit of pure copper on the cathode with an economical expenditure of electricity; the potential at the terminals of the vat may be very near that which obtains in the electrolytic refining of copper, say from 0.2 to 0.5 volt. The reason for this low voltage is that during the electrolysis the $SO_4$ ions which arrive at the anode transform a molecule of cuprous sulfite into a molecule of copper and a molecule of sulfur dioxid, so that there is no liberation of oxygen at the anode.

To illustrate the succession of operations for obtaining, by the application which has just been described, pure copper from its ores, the following example may be given as applied to sulfid ores. The mineral is roasted, then lixiviated with the ammoniacal solution of ammonium sulfate. After having expelled from the solution the free ammonia which is to be used in a subsequent lixiviation, the sulfitization process follows, the reaction being:—

(1) $3Cu(OH)_2 + 3SO_2 =$
$SO_3Cu, SO_3Cu_2 + H_2SO_4 + 2H_2O$.

In this solution in presence of the precipitated cuproso-cupric sulfite, a second molecule of sulfuric acid is added and heat applied. There is then produced the reaction:—

(2) $SO_3Cu, SO_3Cu_2 + 2H_2SO_4 =$
$2CuSO_4 + Cu + 2H_2O + 2SO_2$.

Thus a third of the total copper is precipitated as pure copper, and at the same time two-thirds of the sulfurous acid are regenerated which are utilized for a subsequent sulfitization. The sole cost in this case consists of a molecule of sulfuric acid per molecule of copper. Even this cost may be avoided, as will presently be seen. The solution above the precipitated pure copper, containing the two molecules of copper sulfate receives the free ammonia of a preceding operation and also a quantity of ammonia corresponding with the equation:—

(3) $2CuSO_4 + 4NH_3 + 4H_2O =$
$2(NH_4)_2SO_4 + 2Cu(OH)_2$.

It may be remarked that this ammonia costs nothing for there are produced two new molecules of ammonium sulfate which treated by lime or lixiviated ore yield back the 4 molecules of ammonia according to the reaction:—

(4) $2(NH_4)_2SO_4 + 2CaO =$
$2CaSO_4 + 4NH_3 + 2H_2O$.

After the addition of ammonia, the solution of lixiviation differs from the initial solution merely in that it contains two more molecules of ammonium sulfate and two molecules of copper oxid already dissolved. This solution being returned to the roasted ore re-dissolves the third molecule of copper and is then subjected to sulfitization as in the first case. When the solution becomes too rich in ammonium sulfate, the latter is withdrawn, in the form of crystals, for example, and treated, as indicated above, with lime.

The sulfuric acid necessary for the preparation of the copper as has been said above (Equation 2) may be obtained by oxidizing a part of the sulfurous acid, either in lead chambers or by the contact process. But there are means for avoiding this cost of sulfuric acid by operating in the following manner:—Instead of regenerating all the ammonia by lime according to Equation (4), a part of it may be obtained by simply decomposing the ammonium sulfate by heat, producing ammonium bisulfate in accordance with the equation:—

(5) $2(NH_4)_2SO_4 = 2NH_4HSO_4 + 2NH_3$.

When it is thus necessary, as has been seen, to dispose of 4 molecules of ammonia for regenerating the solution of lixiviation, the two other molecules are derived from the treatment of a single molecule of ammonium sulfate with the lime or the lixiviated mineral, according to the equation:—

(4') $(NH_4)_2SO_4 + CaO = CaSO_4 + 2NH_3 + H_2O$.

As the two molecules of ammonium bisulfate, they may be substituted for the molecule of sulfuric acid in the operation of transforming the sulfite into copper (Equation 2) which then happens according to the equation:—

(2') $SO_3Cu, SO_3Cu_2 + 2NH_4HSO_4 + H_2SO_4 =$
$2CuSO_4 + Cu + (NH_4)_2SO_4 + 2H_2O + 2SO_2$.

The sole difference from the case of treating with sulfuric acid is that there is here formed in solution a molecule of ammonium sulfate, which must be added to the two molecules that are derived as previously from the reaction:—

(3) $2CuSO_4 + 4NH_3 + 4H_2O =$
$2(NH_4)_2SO_4 + 2Cu(OH)_2$.

During the regeneration of the lixiviation solution there are obtained the three molecules of ammonium sulfate necessary for the regeneration of the 4 molecules of ammonia as has just been indicated.

As has been seen, the process costs practically nothing for material and the pure copper is obtained simply by utilizing the sulfur of the cupriferous sulfid ore.

I declare that what I claim is:

1. The herein described process for obtaining pure copper from a solution containing salts of copper, which consists in treating said solution with a sulfite for producing a precipitate containing cuprous sulfite, and treating said cuprous sulfite with an acid to reduce a portion thereof to metallic copper.

2. The herein described process for obtaining pure copper from a solution containing salts of copper, which consists in treating said solution with a sulfite for producing a precipitate containing cuprous sulfite, and treating said cuprous sulfite with sulfuric acid to reduce a portion thereof to metallic copper.

3. The herein described process for obtaining pure copper from a solution containing salts of copper, which consists in treating said solution with sulfurous acid for producing a precipitate containing cuprous sulfite, and treating said cuprous sulfite with an acid to reduce a portion thereof to metallic copper.

4. The herein described process for obtaining pure copper from a solution containing salts of copper, which consists in treating said solution with a sulfite for producing a precipitate containing cuprous sulfite, treating said cuprous sulfite with an acid to reduce a portion thereof to metallic copper, forming said metallic copper into suitable anodes, and subjecting said anodes to an electrolytic refining process.

5. The herein described process for obtaining pure copper from a solution containing salts of copper, which consists in treating said solution with sulfurous acid for producing a precipitate containing cuprous sulfite, treating said cuprous sulfite with sulfuric acid to reduce a portion thereof to metallic copper, forming said metallic copper into suitable anodes, and subjecting said anodes to an electrolytic refining process.

6. The herein described process for obtaining pure copper from a solution containing salts of copper, which consists in treating said solution with a sulfite for producing a precipitate containing cuprous sulfite, reducing a portion of said cuprous sulfite to metallic copper by treating it with an acid, forming said metallic copper and the unreduced portion of cuprous sulfite into suitable anodes, and subjecting said anodes to an electrolytic refining process.

In testimony whereof I have signed my name to this specification in the presence of two subscribing witnesses.

LUCIEN JUMAU.

Witnesses:
 JULES FAYOLLET,
 EUGÈNE PICHOM.